Nov. 3, 1953 F. LINNEMAN 2,657,934
BOAT TRAILER
Filed Aug. 16, 1951 3 Sheets-Sheet 1

Fred Linneman
INVENTOR.

Nov. 3, 1953    F. LINNEMAN    2,657,934
BOAT TRAILER
Filed Aug. 16, 1951    3 Sheets-Sheet 2

Fred Linneman
INVENTOR.

Nov. 3, 1953 F. LINNEMAN 2,657,934
BOAT TRAILER
Filed Aug. 16, 1951 3 Sheets-Sheet 3
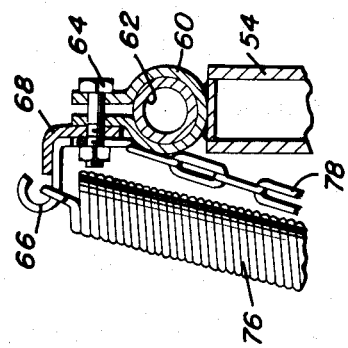
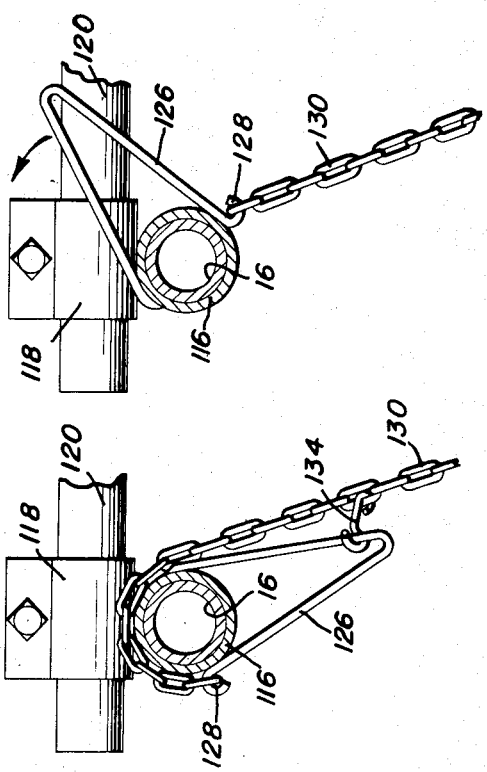
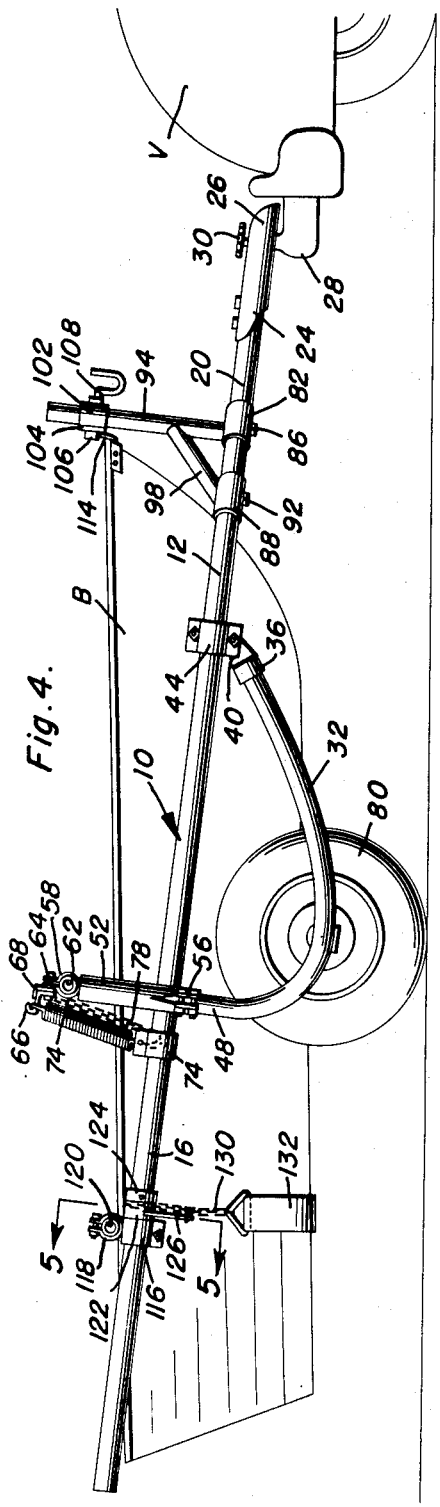
Fred Linneman
INVENTOR.

Patented Nov. 3, 1953

2,657,934

UNITED STATES PATENT OFFICE 2,657,934

BOAT TRAILER

Fred Linneman, Estelline, S. Dak.

Application August 16, 1951, Serial No. 242,084

7 Claims. (Cl. 280—33.4)

1

This invention relates to new and useful improvements in boat trailers and contains subject matter similar to that disclosed in my co-pending application Serial No. 11,369, now U. S. Patent No. 2,564,702, issued August 21, 1951.

The primary object of the present invention is to provide a boat trailer composed of a pair of side members adapted to be coupled to a towing vehicle and novel and improved wheel mounts attached to the side members, whereby the trailer may effectively support a boat.

Another important object of the present invention is to provide a boat trailer of the aforementioned character wherein the wheel mounts each consists of a pair of U-shaped supports pivoted at one of these ends to the side members for vertical swinging movement and spring connected to the side members at their other ends to form a resilient suspension for the side members and the boat supported thereby.

A further object of the present invention is to provide a boat trailer having a forward support for one end of a boat and a rear support including a cross-rod and a sling for clampingly supporting the other end of the boat.

A still further aim of the present invention is to provide a boat trailer aforedescribed wherein the wheel mounts and boat supporting means are adjustable longitudinally upon the side members, whereby the trailer may be employed for hauling boats of various lengths in a convenient manner.

Other objects and advantages reside in the details of construction and operation as more fully hereinafter described and claimed, reference being had to the accompanying drawings forming part hereof, wherein like numerals refer to like parts throughout, and in which:

Figure 4 is a view similar to Figure 2 but showing a boat supported by the trailer and the trailer coupled to the rear of a vehicle;

Figure 5 is an enlarged vertical sectional view taken substantially on the plane of section line 5—5 of Figure 4;

Figure 6 is a view similar to Figure 5 but showing the manner in which the boat sling connecting means is raised to the position shown in Figure 5;

Figure 7 is an enlarged detail vertical sec-

Figure 1:
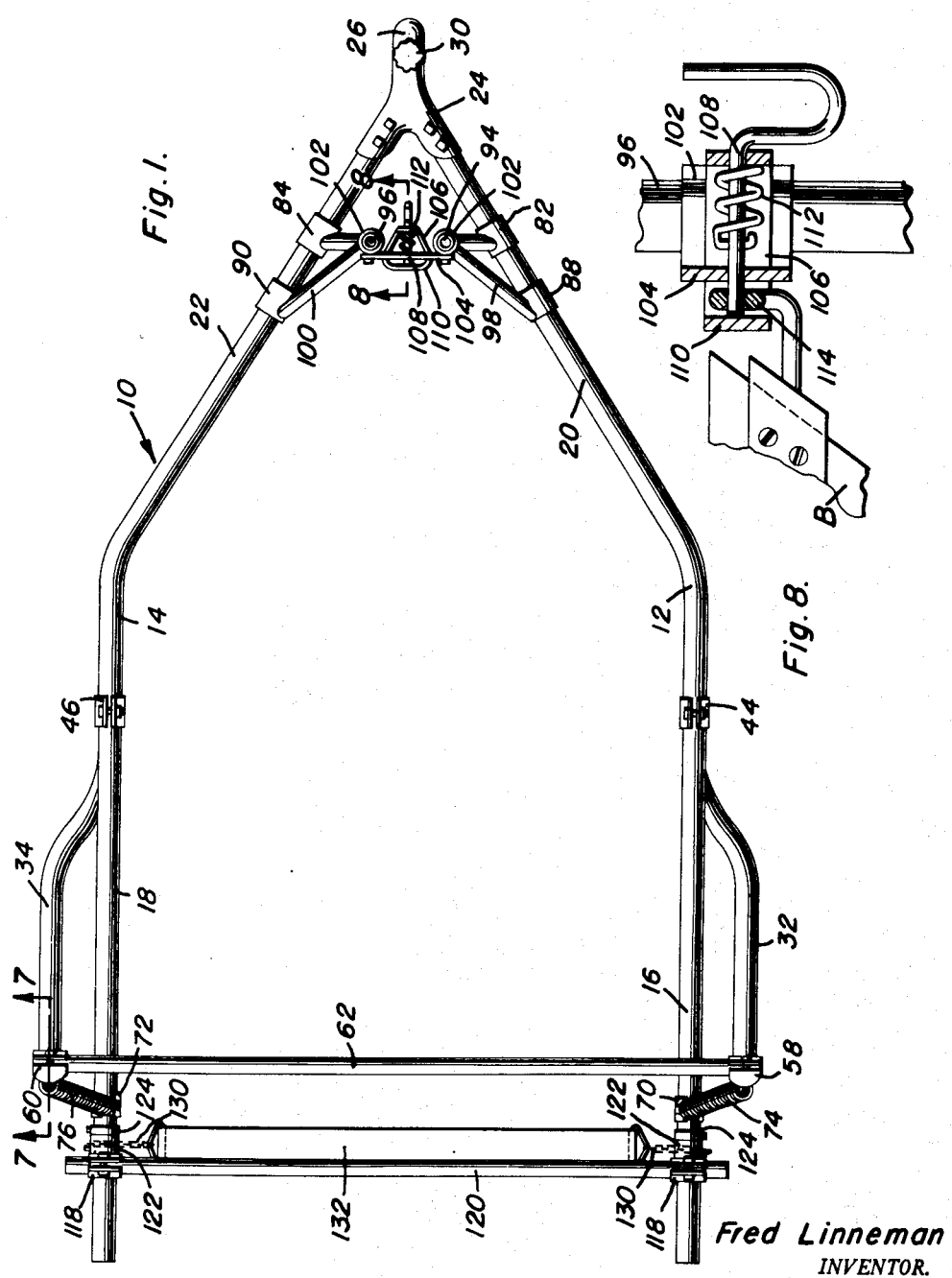
Figure 1 is a plan view of the present invention.
Figure 2:
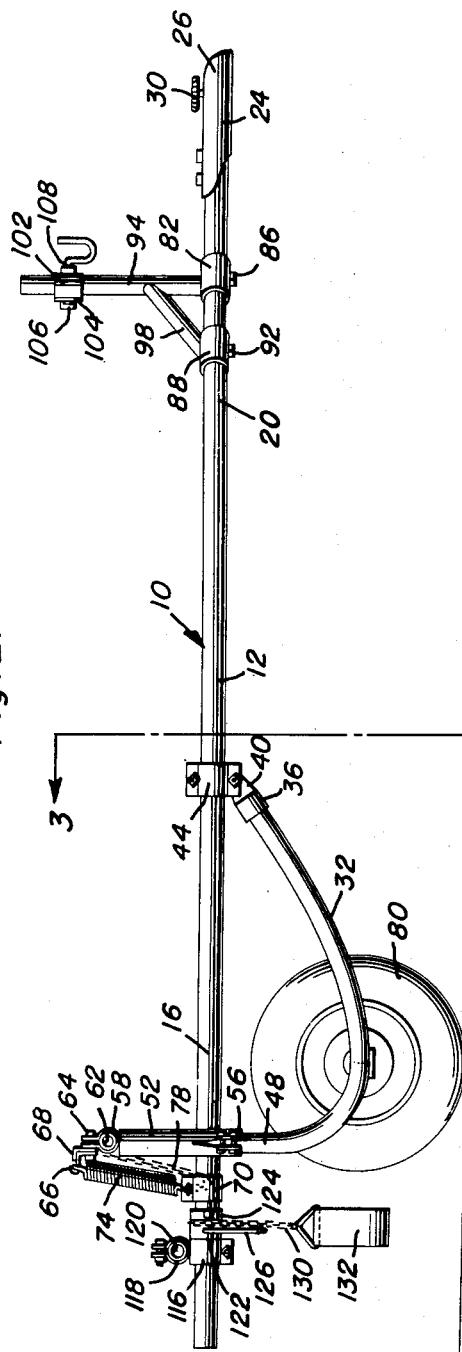
Figure 2 is a side view of Figure 1.
Figure 3:
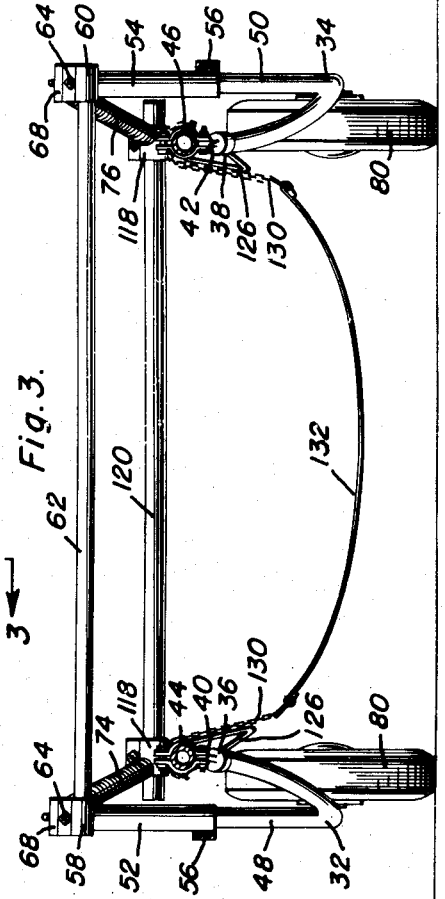
Figure 3 is a vertical transverse sectional view taken substantially on the plane of section line 3—3 of Figure 2.

2 tional view taken substantially on the plane of section line 7—7 of Figure 1; and, Figure 8 is an enlarged detail vertical sectional view taken substantially on the plane of section line 8—8 of Figure 1.

Referring now to the drawings in detail, wherein for the purpose of illustration, there is disclosed a preferred embodiment of the present invention, the numeral 10 represents a wheeled frame including a pair of tubular side members 12 and 14 having straight rear portions 16 and 18 and inwardly and forwardly inclined forward end portions 20 and 22.

A combined connection and coupling member 24 is fixed to the forward extremities of the portions 20 and 22, and includes a forward extension 26 having a socket to accommodate a spherical element 28 releasably mountable on the rear of a vehicle V. A suitable manually adjustable retainer 30 will retain the ball in the socket of extension 26 while permitting universal movement of the extension on the ball.

The frame 10 also includes a pair of substantially U-shaped tubular supports 32 and 34 whose upwardly and forwardly inclined and offset ends threadingly enter socket elements 36 and 38 fixedly supporting ears 40 and 42. Clamps 44 and 46 slidably adjustable mounted on the intermediate portions of the side members 12 and 14 are pivoted to the ears 40 and 42 by the same fasteners joining the lower ends of the halves forming the clamps 44 and 46.

The upstanding rear ends 48 and 50 of the supports 32 and 34 enter the lower split ends of substantially vertical tubes 52 and 54 which split ends are expansible and contractable by the connections 56 to permit clamping thereof about the ends 48 and 50.

Split clamps 58 and 60 are fixed to the upper closed ends of the tubes 52 and 54 and receive the ends of a cross-bar 62 that connects the rear ends of the supports. Fasteners 64 join the ends of each clamp 58, 60 and carry hook elements 66 and L-shaped retainers 68 that engage the hook elements to prevent rotation thereof on the fasteners 64, as shown best in Figure 7.

Additional split clamps 70 and 72 are slidably adjustably mounted on the side members 12 and 14 behind the supports 32 and 34 and the fasteners joining the spaced end of each clamp 70, 72 engage the lower eye ends of coil springs 74 and 76 whose upper eye ends receive the hook elements 66. Chains 78 terminally secured to the fasteners 64 and the clamps 70 and 72 limit downward movement of the side members 12 and 14 relative to the cross-bar 62.

The low points of the supports 32 and 34 support axles for wheels 80, preferably of the pneumatic type, which are spaced apart sufficiently to permit a boat B to be supported between and spaced from the wheels.

Since the supports 32 and 34 are pivoted to the side members 12 and 14 for vertical swinging movement with the rear ends of the supports spring connected to the side members 12 and 14, the side members may move upwardly and downwardly as the wheels ride over bumps or rough terrain to resiliently support the boat and cushion the upward and downward movement of the boat and the side members.

Means is provided for supporting the forward end of the boat B on the frame 10 and this means comprises forward sleeves 82 and 84 slidably received on the end portions 20 and 22 and held slidably adjusted by set screws 86. Rear sleeves 88 and 90 are also slidably received on the end portions 20 and 22 and are held in adjusted position by set screws 92.

Posts 94 and 96 rise from and are fixed to the sleeves 82 and 84, and braces 98 and 100 connect the sleeves 88 and 90 to the posts 94 and 96. Collars 102, suitably vertically adjustably held, on the posts are connected by a cross-strap 104 carrying a holder and guide 106 for a sliding pin 108, the latter being urged against the rear portion 110 of the holder and guide 106 and through an aperture in the strap 104 by a spring 112.

An eye member 114 is anchored on the forward end of boat B and extends behind strap 104 and in front of portion 110 to receive the pin 108.

Means is provided for clampingly supporting the rear end of the boat B on the frame 10 and this means comprises a pair of clamps 116 that are slidably adjustably mounted on the rear portions 16 and 18 and whose upper portions support co-axial clamps 118 that clampingly embrace the ends of a cross-rod 120.

Collars or sleeves 122 are rotatably supported on the portions 16 and 18 in front of the clamps 116 and behind rings 124 retained on the portions 16 and 18 by suitable set screws. The sleeves 122 are fixed to and between the ends of V-shaped wire members 126 each having a hook 128 at one of their ends that engages chains 130 which are secured to the ends of a strap or sling 132.

The rear end of the boat B rests on the sling 132 and in order to raise the rear end of the boat so that the same will be clamped between the sling and the cross-rod 120, it is merely necessary to rotate the sleeves 116, by the members 126, until the chains 130 are wrapped about the sleeves 116, as shown in Figure 5, after which hooks 134, slidably on the members 126, are engaged with links of the chains. The boat will thereby be releasably supported on the frame for movement therewith.

Obviously, the axles supporting the wheels 80 may extend outwardly so that the wheels would be disposed along the outer faces of the supports 32 and 34.

Having described the invention, what is claimed as new is:

1. A boat trailer comprising a pair of side members adapted to support a boat and to be coupled at one of their ends to a towing vehicle, a pair of side by side substantially V-shaped supports having forward ends pivotally secured to the members, the rear ends of said supports extending upwardly beyond the members, spring means connecting the rear ends of the supports to the members and extending downwardly from the rear ends of the supports toward the members, and wheels carried by the supports intermediate their ends.

2. A boat trailer comprising a pair of side members adapted to support a boat and to be coupled at one of their ends to a towing vehicle, a pair of side by side substantially V-shaped supports including forward ends and upstanding rear ends, means pivotally securing the forward ends of the supports to the members, the rear ends of said supports extending upwardly past the members, a cross-bar connecting the rear ends of said supports, coil springs securing the rear ends of said supports to said side members, and wheels carried by said supports.

3. A boat trailer comprising a pair of side members each having a forward portion and a rear portion, means carried by the forward portions of said members for supporting the forward end of a boat, means carried by the rear portions of said members for supporting the rear end of the boat, a pair of side by side V-shaped supports having forward and rear ends, means slidably adjustably mounted on said members and pivoted to the forward ends of said supports, a tube releasably secured over the rear end of each support, a clamp supported by each tube, a cross bar held in each clamp, springs connecting the clamps to the members, and a wheel carried by each support.

4. A boat trailer comprising a pair of side members having forward end portions and rear end portions, the forward end portions of said members extending toward each other, means joining the forward end portions of said members and including a coupling for engaging a towing vehicle, means supported on the forward end portions of said members for engaging and supporting the front end of a boat, means carried by the rear end portions of said members for supporting the rear end of a boat, a pair of side supports having forward portions pivoted to said members for vertical swing movement, said supports including rear portions extending upwardly beyond the side members, means extending over the members and connecting the rear portions of said supports together, coil springs connecting the rear portions of said supports to said members, and a wheel carried by each support.

5. A boat trailer comprising a pair of side members having forward end portions and rear end portions, the forward end portions of said members extending toward each other, means joining the forward end portions of said members and including a coupling for engaging a towing vehicle, means supported on the forward end portions of said members for engaging and supporting the front end of a boat, means carried by the rear end portions of said members for supporting the rear end of a boat, a pair of side supports having forward portions pivoted to said members for vertical swing movement, said supports including rear portions extending upwardly beyond the side members, a vertical tube releasably supported on the rear portion of each support, a clamp fixed to each tube, a cross-bar having its ends held in said clamps, coil springs having upper ends attached to said clamps and lower ends attached to said members, and a wheel carried by each support.

6. The combination of claim 4 wherein said means for supporting the rear end of a boat comprises a rigid cross-rod terminally secured to said side members, a sling underlying said cross-rod and movable toward and away from said cross-rod, and means connecting said sling to said side members and including means for retaining the sling raised and relatively close to the cross-rod to clamp a boat between the cross-rod and the sling.

7. The combination of claim 4 wherein said means for supporting the rear end of a boat comprises a rigid cross-rod terminally secured to said side members, a sling underlying said cross-rod and movable toward and away from said cross-rod, a collar rotatably mounted on each side member, a wire loop secured to each collar, chains connecting the loops to the sling, and hooks slidable on the loops and engaging the chains to retain the sling raised and relatively close to the cross-rod and to hold the collars against rotation.

FRED LINNEMAN.

References Cited in the file of this patent

UNITED STATES PATENTS

| Number | Name | Date |
|---|---|---|
| 2,287,955 | Zunino | June 30, 1942 |
| 2,516,574 | Holly | July 25, 1950 |

FOREIGN PATENTS

| Number | Country | Date |
|---|---|---|
| 604,947 | France | May 17, 1926 |
| 637,168 | France | Apr. 24, 1928 |